United States Patent [19]
Mann et al.

[11] Patent Number: 5,327,053
[45] Date of Patent: Jul. 5, 1994

[54] APPARATUS AND METHOD FOR DETECTING ROTOR POSITION IN A SENSORLESS AND BRUSHLESS DC MOTOR

[75] Inventors: Christopher E. Mann, Santa Cruz; Robert P. Cloutier, Campbell; Michael W. Null, Santa Cruz, all of Calif.

[73] Assignee: Seagate Technology, Inc., Scotts Valley, Calif.

[21] Appl. No.: 929,614

[22] Filed: Aug. 12, 1992

[51] Int. Cl.⁵ .................................. H02D 7/00
[52] U.S. Cl. ........................... 318/254; 318/439
[58] Field of Search ................ 318/254, 138, 439

[56] References Cited

U.S. PATENT DOCUMENTS

| | | | |
|---|---|---|---|
| 3,909,688 | 9/1975 | Blaschke et al. | 318/227 |
| 4,641,066 | 2/1987 | Nagata et al. | 318/254 |
| 4,651,069 | 3/1987 | Pellegrini | 318/254 |
| 4,673,849 | 6/1987 | Sears et al. | 318/138 X |
| 4,678,973 | 7/1987 | Elliott et al. | 318/254 |
| 4,743,815 | 5/1988 | Gee et al. | 318/254 |
| 4,814,676 | 3/1989 | Van Hout | 318/254 |
| 4,922,169 | 5/1990 | Freeman | 318/254 |
| 4,928,043 | 5/1990 | Plunkett | 318/254 |
| 4,983,894 | 1/1991 | Oku et al. | 318/138 |
| 5,017,845 | 5/1991 | Carobolante et al. | 318/138 |

*Primary Examiner*—Jonathan Wysocki
*Attorney, Agent, or Firm*—Flehr, Hohbach, Test, Albritton & Herbert

[57] ABSTRACT

An apparatus and process for detecting rotor position for improved motor start-up. The apparatus detects a target equilibrium position of the rotor using a fixed gain amplifier, window comparator and slope detector circuitry. The window comparator circuitry qualifies the peaks of the back EMF signal. Slope detector circuitry pinpoints the peak of the back EMF signal qualified by the window comparator. The technique utilizes the steps of energizing the phase windings of said motor, detecting the target equilibrium position, and then accelerating the motor through a commutation process.

10 Claims, 10 Drawing Sheets

APPARATUS AND METHOD FOR DETECTING ROTOR POSITION IN A SENSORLESS AND BRUSHLESS DC MOTOR

FIELD OF THE INVENTION

This invention relates to DC brushless motors and more particularly to a method and process for starting such motors without the use of physical rotor position detectors.

BACKGROUND OF THE INVENTION

Brushless DC motors generally include rotor position detectors, such as Hall sensors, positioned on the motor stator. Such devices sense the magnetic field of permanent magnets on the rotor as such magnets move over the sensors. By detecting the magnitude and polarity of the magnetic field, Hall sensors provide angular position information which is employed to switch current to the proper motor windings at the correct time through a process known as commutation. Such position information is critical for efficient motor start up in the desired direction. Failure to achieve start-up in the proper direction or to minimize reverse rotation of the rotor could cause damage to the heads when utilized in magnetic storage disc drive devices.

Motor construction typically includes a rotor formed of one or more pairs of magnetic pole pieces which rotate relative to a phase stator. Frequently, brushless DC motor construction consists of a three phase stator winding. Individual motor phases can be energized separately or in combination. The energizing of such phase or phases is typically predetermined. The resulting torque developed due to an electrical current in a motor winding is a function of the angular position of the rotor. Generally, the function can be approximated by a sinusoidal curve. Over one electrical cycle, one permanent magnetic pole pair, half of the torque developed is positive and the other half is negative. The magnitude and sign of the developed torque depends on the angular position of the rotor relative to the windings. Without rotor position information, maximum torque and correct rotation direction can not be guaranteed.

The requirement for smaller and lower cost brushless DC motors has required the removal of Hall or similar sensors from the motors. Reverse rotation of DC motors in disc drives can result in head or medium damage. Therefore, alternative methods are necessary for obtaining angular position for motor start up.

SUMMARY OF THE INVENTION

In accordance with the present invention, an apparatus and process are disclosed for use in a brushless DC motor. More specifically, the apparatus and accompanying technique discloses a method for detecting rotor position during the start-up process. The apparatus requires means for detecting a target equilibrium position of the rotor. The technique utilizes the steps of resetting the control circuitry, energizing the motor phase windings, detecting the target equilibrium position, and then accelerating the motor through a commutation process.

Assuming a three-phase brushless DC motor, it is well known that each energized winding generates a sinusoidal relationship between torque and angle which is out of phase with other windings. If a pair of phases are energized together, the resultant torque will be the sum of the two individual phases. In order to generate maximum positive torque on the rotor, it is necessary to switch energized phase pairs at the cross-over points of the different torque curves.

In addition to the sinusodial torque generated in each of the phases, there is also a sinusodial back EMF voltage. This back EMF voltage is a function of motor speed and position. Back EMF voltage is also generated in a motor phase which is unenergized assuming the rotor has some velocity. The polarity of the back EMF voltage is a function of motor position and the direction of rotation. It is the back EMF voltage in the unenergized winding which is employed in the present invention for determining position and direction information during motor start-up.

The motor start-up scheme is begun by resetting control circuitry to a known state. Next, assuming a three-phase motor, one pair of phase windings is energized. Since the rotor position at start-up is arbitrary relative to the torque angle curve of the two energized phases, one of three situations may occur. First, the rotor position could be along the torque angle curve where positive torque is developed when the windings are energized. Alternatively, the rotor position could be along the torque angle curve so as to result in negative torque, i.e. reverse rotation, upon energizing the phases. Finally, the rotor could be in the stable and unstable equilibrium points where no torque is developed. These three situations will actually be considered as two possible alternatives in which the rotor is in a position to generate torque or not.

In the first alternative, the rotor is in an initial position such that torque will be generated in either a positive or negative manner when the winding pair is energized. This situation will cause the rotor to move in either a positive direction or reverse direction with respect to the motor stator and correspondingly generate a back EMF voltage in the off winding. With the phase pair remaining energized, the rotor will oscillate around the stable equilibrium point of the energized torque angle until it damps out and rests there. As the rotor oscillates along its torque angle curve, back EMF voltage also oscillates until the motor damps out to its stable equilibrium point. This stable equilibrium point is a known position relative to the motor windings.

Additionally, it should be noted that the peaks of the back EMF voltage wave form occur at the equilibrium points on the torque angle curve. By examining the back EMF voltage, the stable equilibrium position can be determined within one or two oscillations of back EMF. It is therefore not necessary to wait for the rotor to damp out to the stable point before commutating. In the second alternative of the rotor not moving, a different phase pair is energized so that torque is generated on the rotor and then the process as described in alternative one is applied to such rotation. Once the rotor position has been determined, motor start-up is carried out by a conventional commutation process.

It is an object of the present invention to eliminate physical rotor position detectors in brushless DC motors.

A further object of the invention is to provide a mechanism for minimizing the start-up time of a brushless DC motor.

A still further object of the invention is to provide a start-up technique for a brushless DC motor in which back EMF voltage is employed to determine rotor position.

A still further object of the invention is to provide a start-up technique for a brushless DC motor which employs window comparator and slope detector circuitry that examines the back EMF signal in the spindle motor to identify rotor position relative to the stator thereby minimizing reverse motor rotation.

Other objects and advantages of the present invention will become apparent from the following description, accompanying drawings and attached claims.

The invention, together with further objects and advantages thereof, may best be understood by reference to the following description taken in conjunction with the accompanying drawings.

DESCRIPTION OF THE INVENTION

Figure 1:
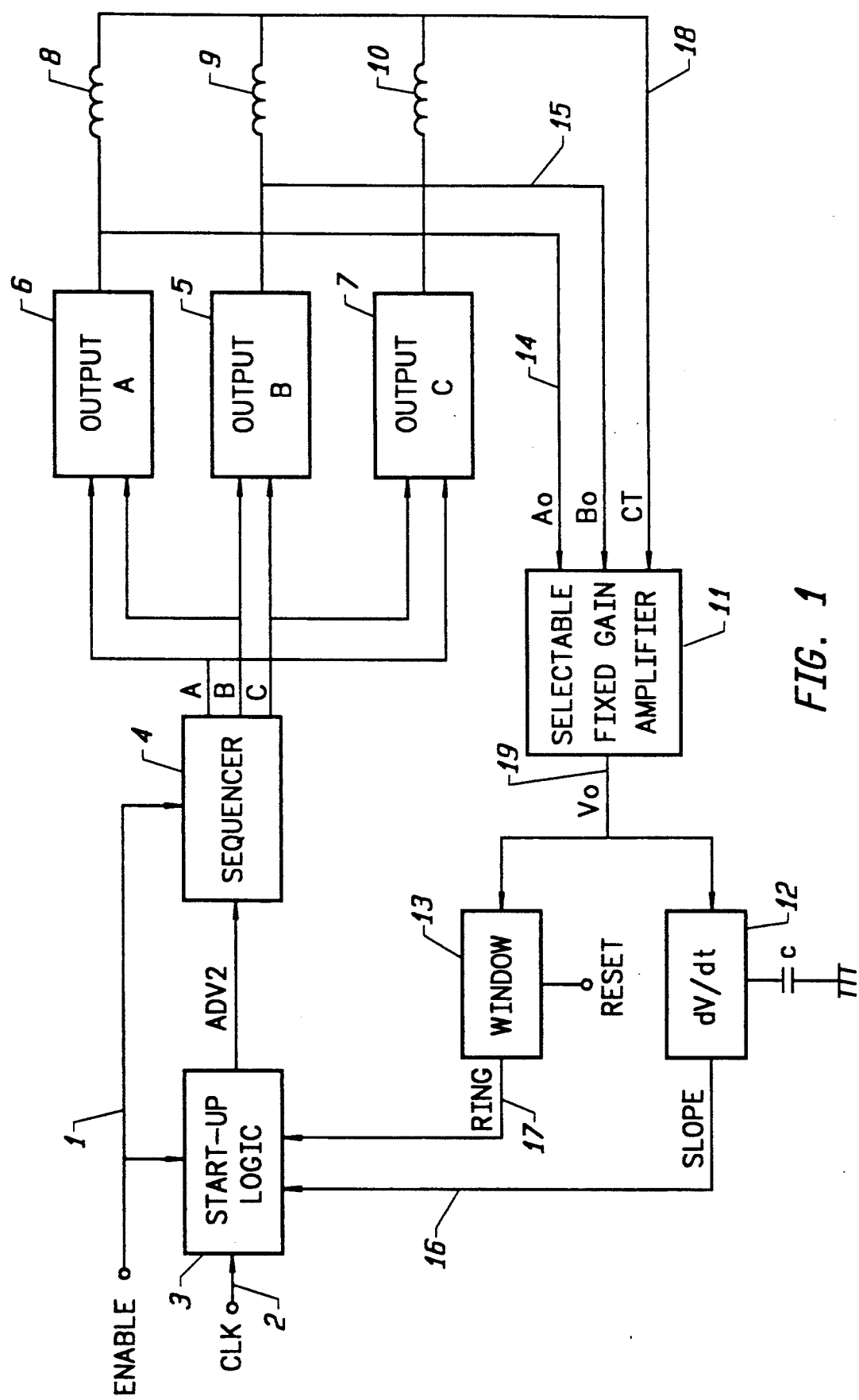
FIG. 1 is a block diagram for a three phase sensorless motor start-up commutation sequence utilizing the preferred embodiment of the present invention.

Referring to FIG. 1, a block diagram representing the startup sequence of a three phase sensorless motor that incorporates the present invention is shown. An enabling signal 1 controlled by circuitry (not shown) is sent to start-up logic circuitry 3 and resets start-up logic circuitry to a known state. Enabling signal 1 also resets sequencer 4. Clock 2 clocks the start-up logic.

Start-up logic controls sequencer 4 controls output circuitry 5, 6, and 7 which are in turn connected to motor windings 8, 9, and 10, respectively. Back EMF signal 14 or 15 in an unenergized motor winding is connected to a selectable fixed gain amplifier 11 as is motor center tap 18. Selectable fixed gain amplifier 11 output signal 19 is transmitted to slope detector 12 and window comparator 13. During start-up, output signals 16, 17 from slope detector 12 and window comparator 13, respectively, are inputed to start-up logic circuitry 2.

Figure 2:
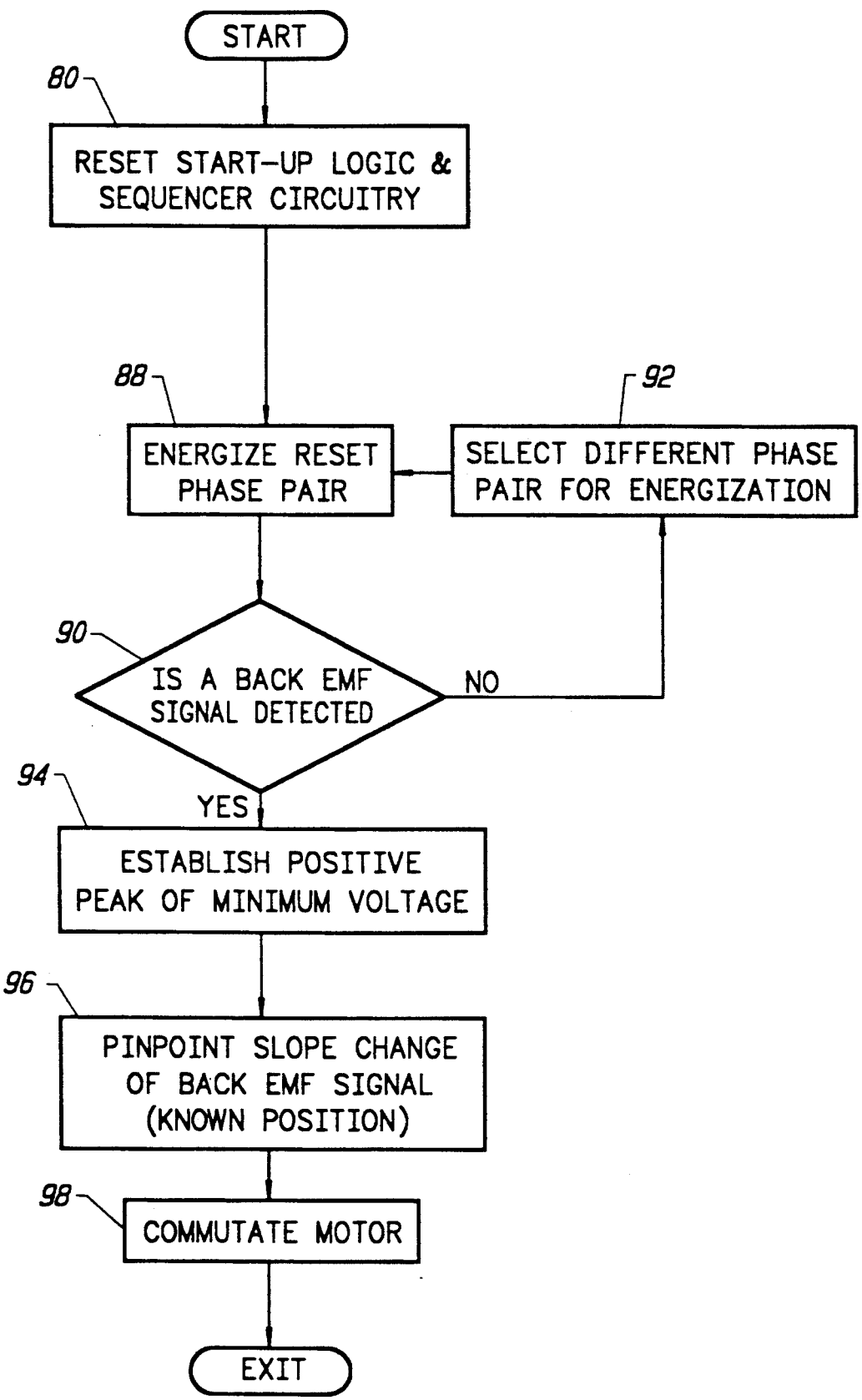
FIG. 2 is a flow chart of the process of determining the rotor location of a brushless DC motor.

The steps for determining rotor location, with respect to the stator are now described with reference to FIG. 2 which is a flowchart representation of the present invention. The initial step for identifying rotor location is to reset the logic circuitry and sequencer as indicated by step 80. Then, in step 88, a pair of motor windings are selected and energized.

Next, back EMF in the unenergized motor winding is examined with respect to the motor center tap. If examination of the back EMF signal indicates zero rotor torque, a different pair of motor windings is selected in step 92 and then energized in step 88.

A non-zero rotor torque indicates rotor movement in response to winding pair energization and the window comparator qualifies positive minimum voltage 94. Slope change at the back EMF peaks qualified by the window comparator corresponds to stable equilibrium position in step 96. Once rotor position relative to the stator is known, the motor is commutated to operating speed in step 98.

When the circuitry represented in FIG. 1 by start-up logic block 3 and sequencer 4 is initially enabled, sequencer 4 defaults to a predetermined reset state. The reset state will always force one of the outputs to be sourcing current to the motor, one output to be sinking current from the motor, and the third output to be in an off state. Motor phase 8 is always the off-winding in the reset state. Since phase 8 in FIG. 1 is the off-winding in the reset state, signal Ao 14 minus signal CT 18 is the signal input examined by selectable fixed gain amplifier 11.

Figure 3:
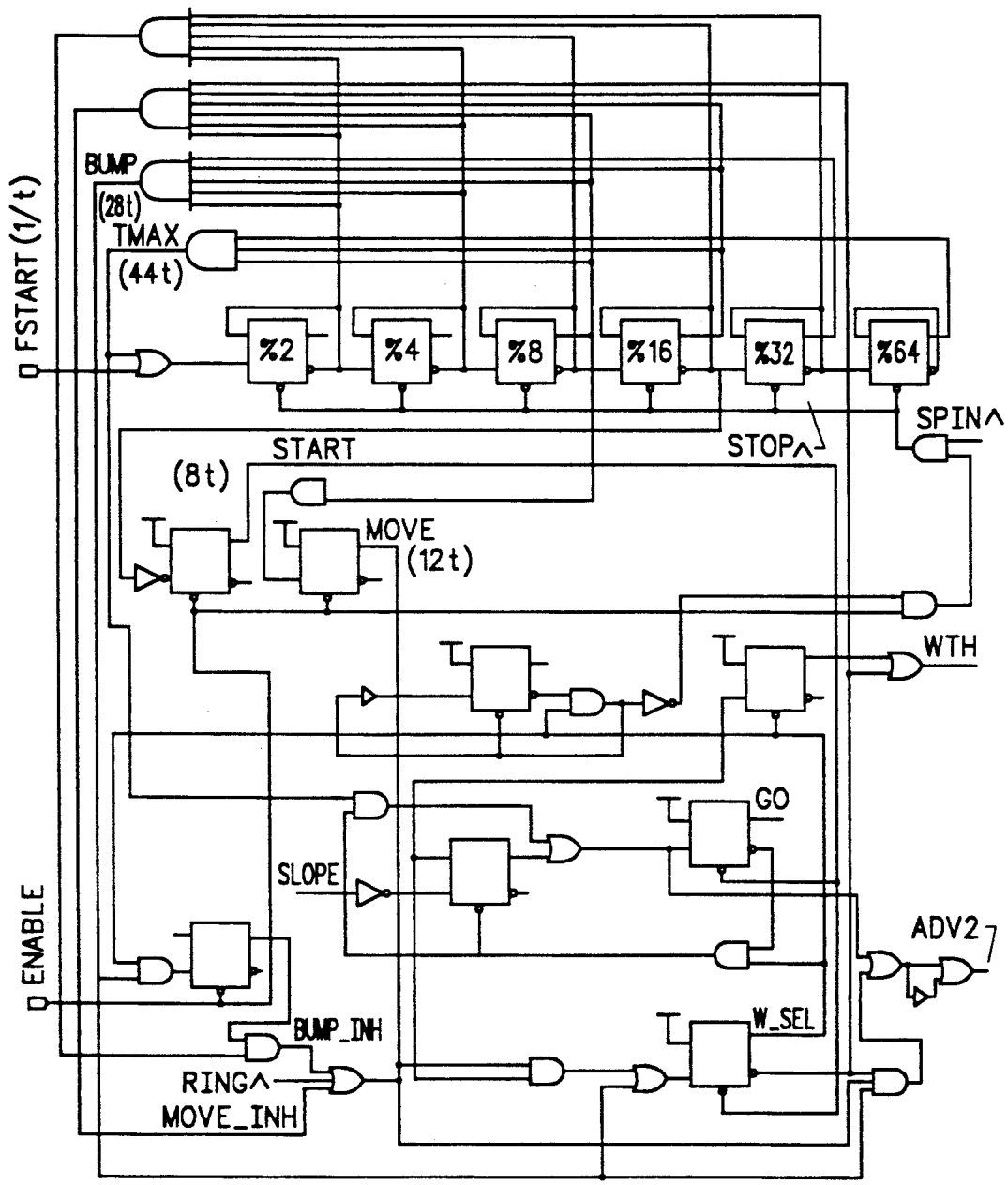
FIG. 3 is a partial block and schematic diagram of the control start-up logic of FIG. 1.
Figure 4:
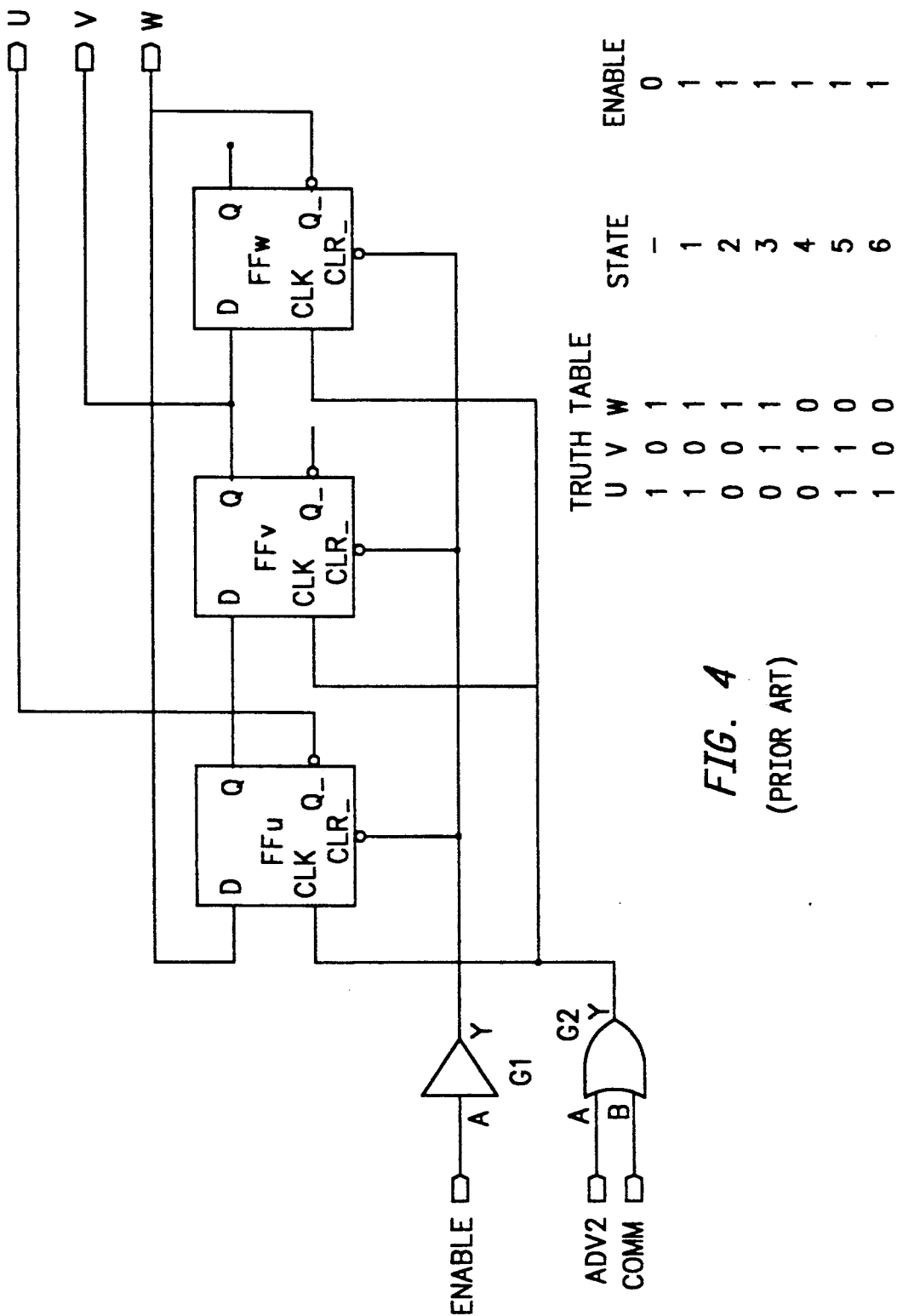
FIG. 4 is a partial block and schematic diagram of the sequencer logic and corresponding truth tables of FIG. 1.
Figure 5:
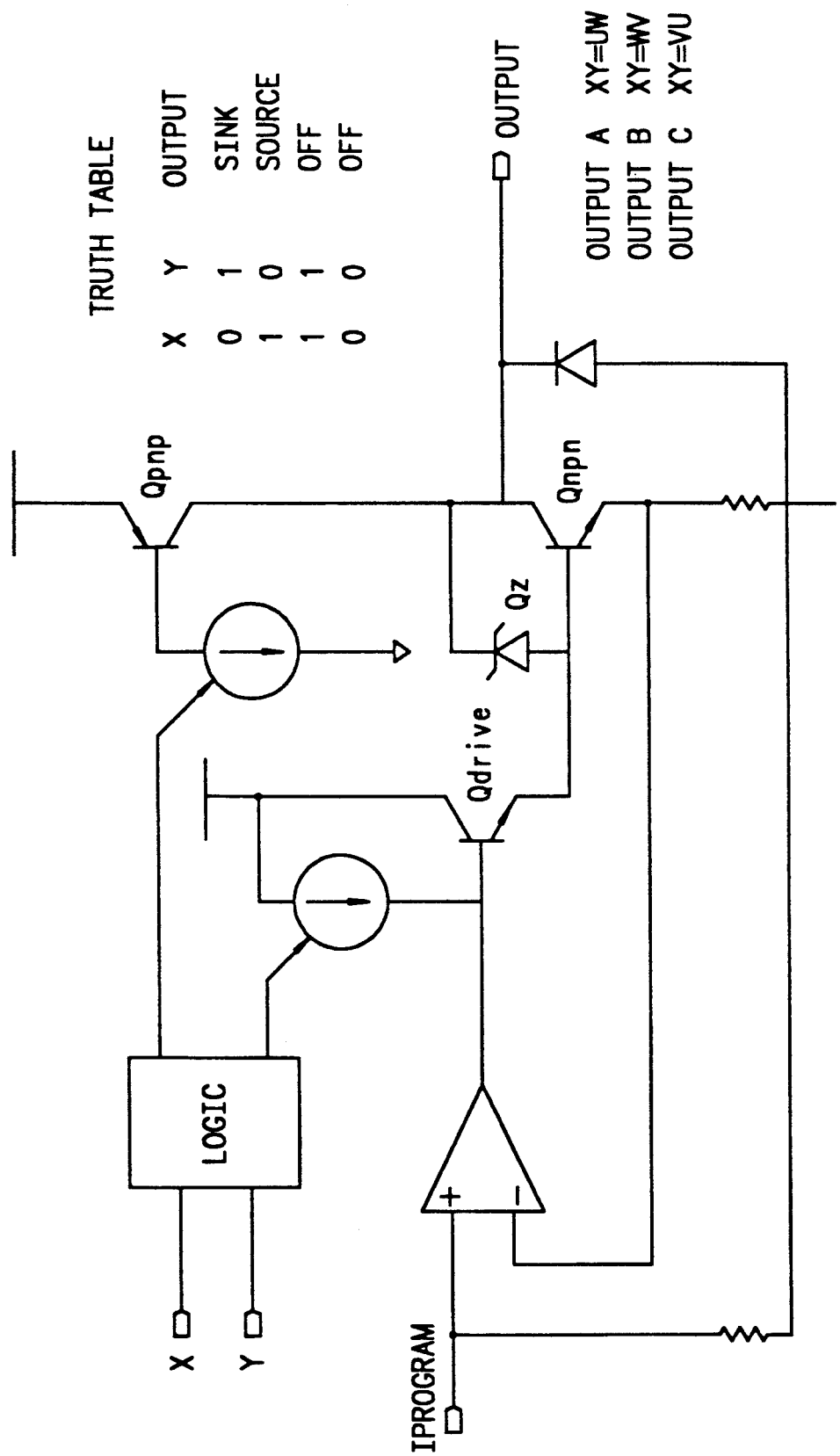
FIG. 5 is a partial block and schematic diagram of the output stage and corresponding truth tables of FIG. 1.

FIGS. 3, 4, and 5 are partial block and schematic diagrams of start-up logic 3, sequencer 4, and outputs 5, 6, and 7 of FIG. 1. The circuitry is depicted primarily in TTL (transistor-transistor-logic). FIGS. 4 and 5 include truth tables utilized in the sequencer and output circuitry logic, respectively. Although the functionality of the start-up logic, sequencer and outputs may be obtained by utilizing standard integrated circuit devices, such circuitry was incorporated into an application specific integrated circuit device which included the window and slope comparator circuitry of the present invention.

When the examined signal Ao 14 is found to be zero by selectable fixed gain amplifier 11, the motor is in an initial zero torque position. In such case when no back EMF voltage is initially detected the start-up logic advances the motor by two states. In such a situation, Bo 15 would be the examined signal. Pin out 20 of the selectable fixed gain amplifier allows selection of signal Bo as the positive input for examination, as shown in FIG. 6.

Selectable fixed gain amplifier 11 has its gain fixed by resistors 21–23, 33–35. By varying the value of the resistors, gain of the amplifier is varied. Although different values could be utilized, the gain of the amplifier in the preferred embodiment is 5. The signal out of the selectable fixed gain amplifier Vo 24 is employed to generate both SLOPE and RING signals.

Figure 6:
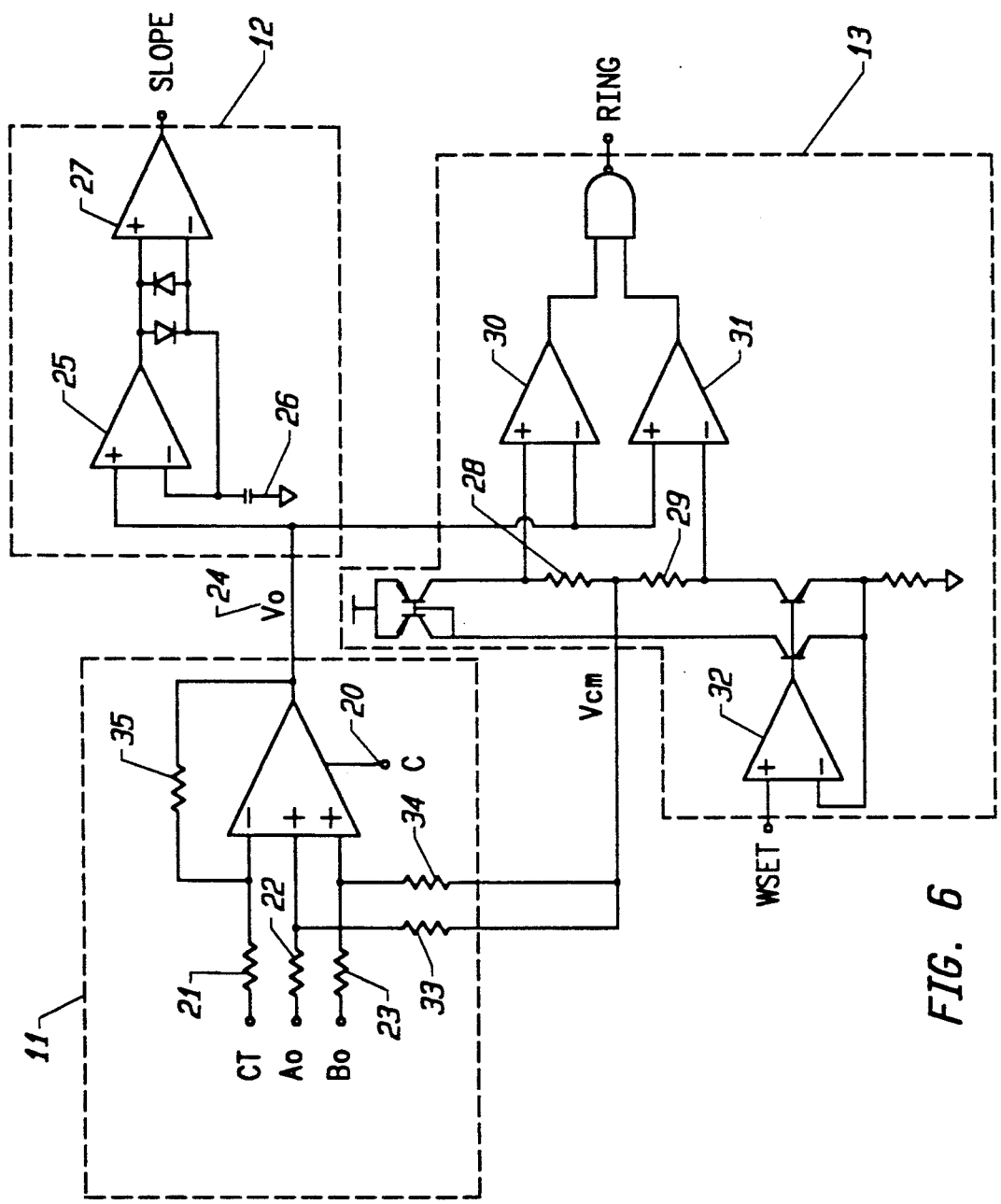
FIG. 6 is a partial block and schematic diagram of the window comparator, slope detector and fixed gain amplifier blocks of FIG. 1.

Slope detector 12 in FIG. 1, is further illustrated in FIG. 6 as an amplifier 25, having external capacitor 26 and comparator 27. The function of the window comparator 27 is to monitor the induced back EMF voltage with respect to a voltage range set by WSET, which range can be varied around common mode voltage Vcm. Resistors 28, 29 are located at the tap point of the common mode voltage and establish the upper and lower voltage range threshold inputs into comparators 30, 31, respectively. The range of the voltage thresholds may be varied by changing the value of the voltage input WSET to amplifier 32. Comparators 30, 31 therefore establish a RING signal having a positive threshold which is the sum of the window common mode plus the upper threshold and window common mode minus the lower threshold respectively. So long as signal Vo 24, is within the established window, the ring signal will be low. If the ring signal is higher than the upper threshold or lower than the lower threshold, the RING signal will be high.

The RING signal is thus used to qualify the induced back EMF signal. The back EMF signal is not utilized unless the corresponding ring signal is high. The ring signal prevents the back EMF from being utilized in the slope differential voltage comparator unless back EMF is at a minimum voltage level.

Figure 7:
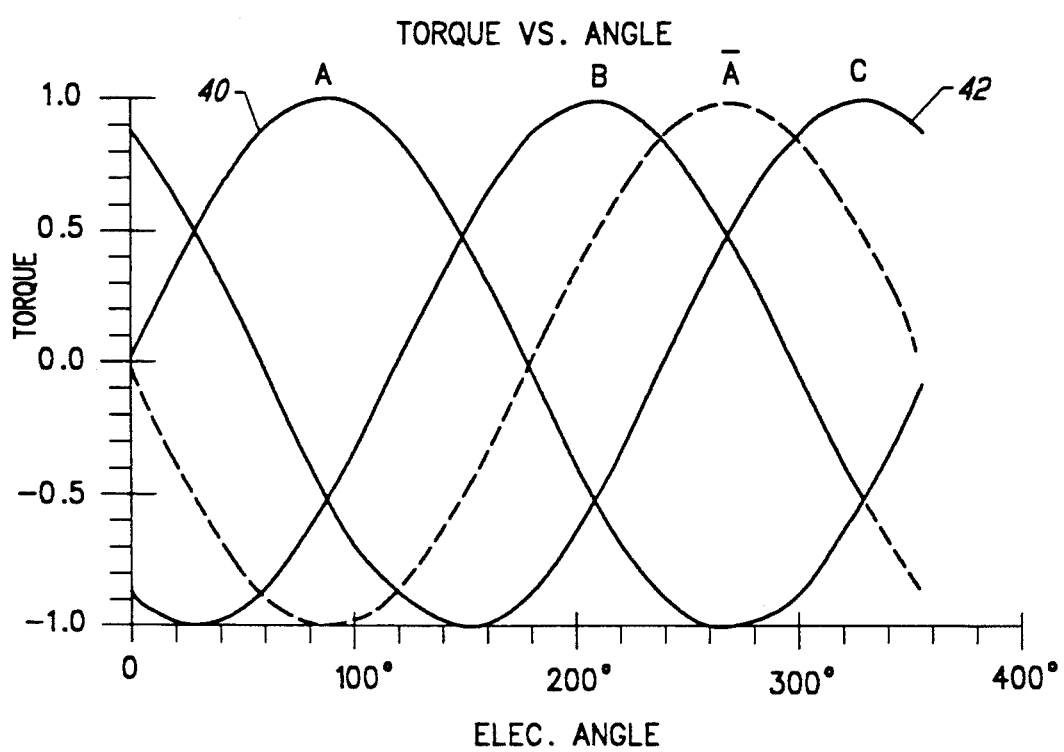
FIG. 7 is an example of torque versus angle plot assuming a three-phase brushless DC motor.

FIG. 7 is a graph depicting torque generated as a function of angle by a single energized winding or phase of a three-phase brushless motor. The energized windings each generate a respective sinusoidal torque 40, 41, 42 incrementally out of phase an equal number of degrees.

Figure 8:
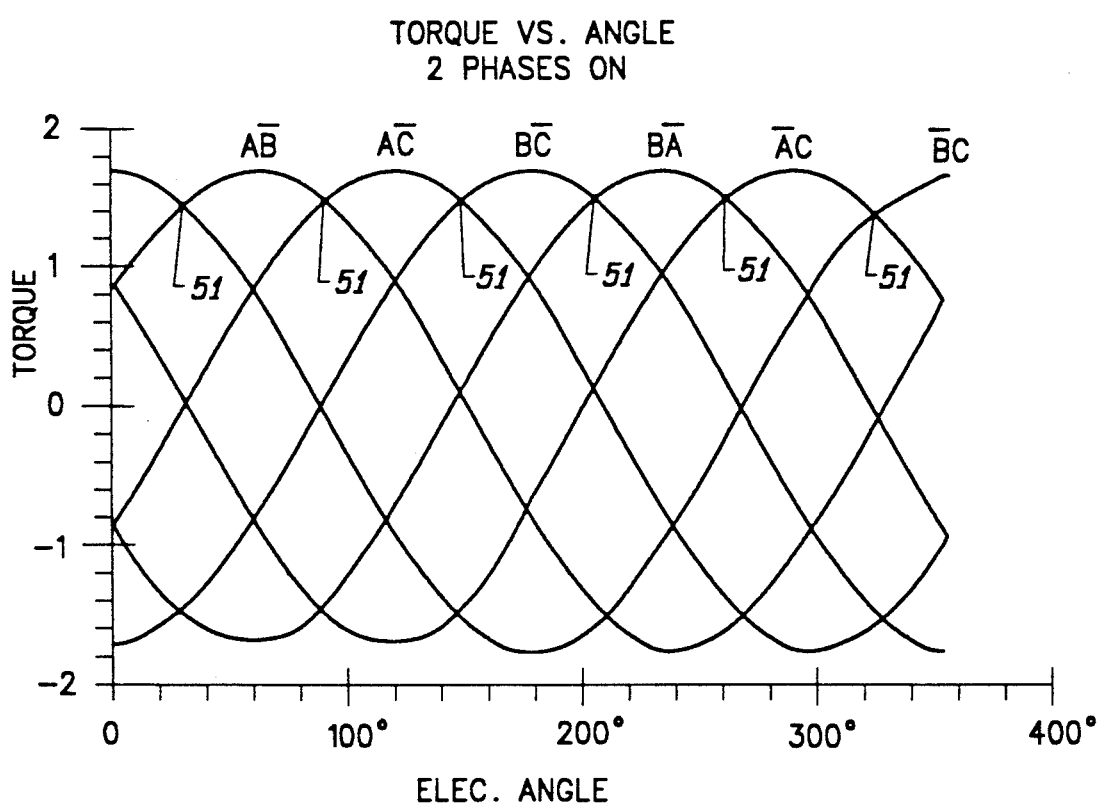
FIG. 8 is also a sinusoidal plot of torque versus angle with a three-phase brushless DC motor with two phases energized.

FIG. 8 illustrates a plot of torque versus angle when energizing a pair of phases simultaneously and shows that to generate maximum positive torque on the rotor it is necessary to switch the energized phased pairs at crossover points 51. Coinciding with the sinusoidal torque generated in each of the phases or phased pairs is a sinusoidal back EMF voltage. This back EMF voltage is a function of motor speed and, more importantly in the case of the present invention, a function of motor position. The back EMF voltage is also generated in a motor phase which is unenergized, as long as the rotor has some velocity. The polarity of this voltage is a function of the motor's position and direction of rotation. The present invention utilizes this back EMF voltage in determining rotor position and direction.

Figure 9:
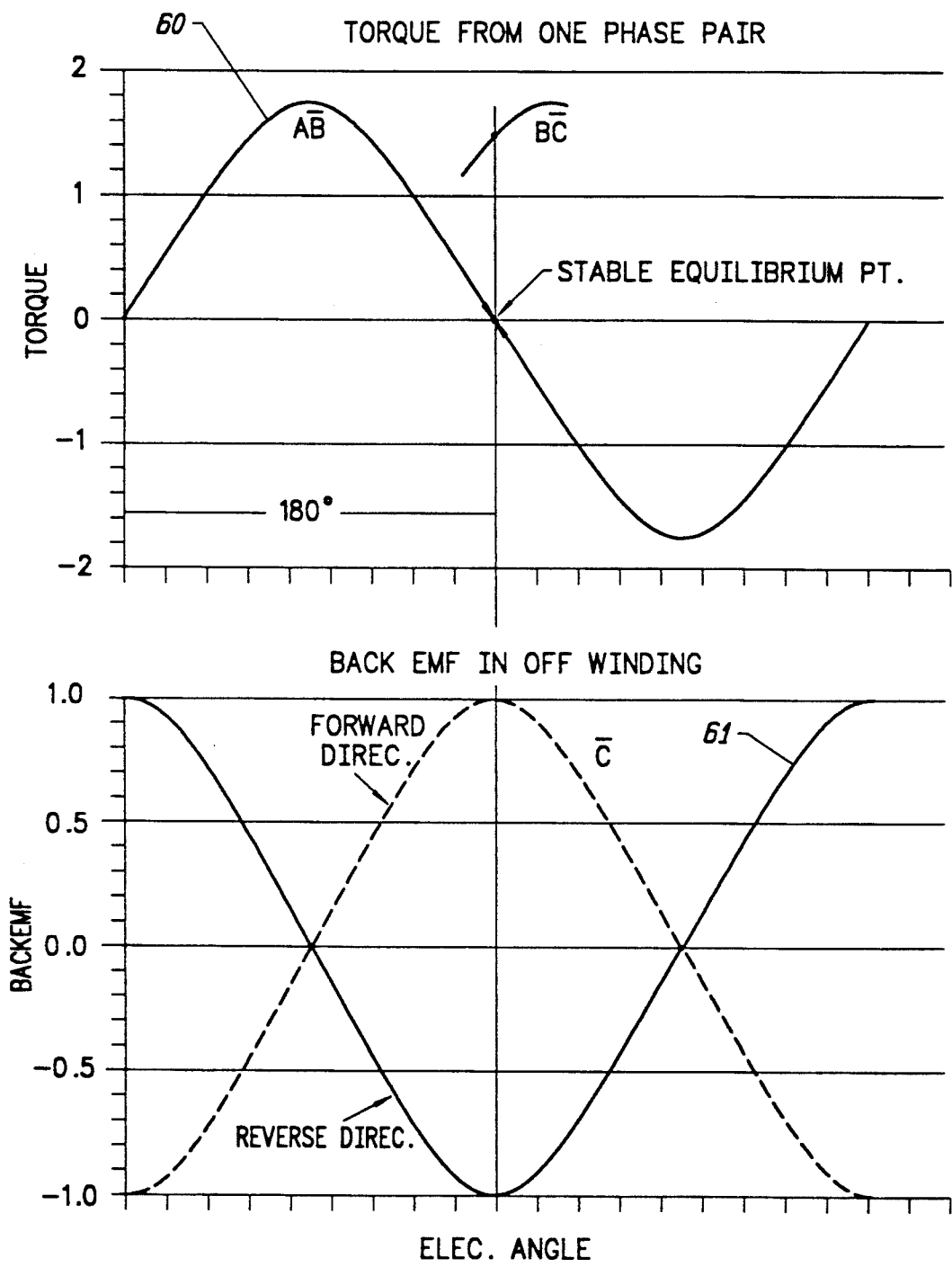
FIG. 9 is a sinusoidal plot of torque and the back EMF voltage in an off-winding of a three-phase brushless DC motor with two phases energized.

FIG. 9 shows a winding pair torque angle curve 60 for phase A energized with positive current and phase B energized with negative current. Also shown is back EMF voltage 61 in the third or unenergized phase. FIG. 9 assumes that the motor is moving at constant velocity. Note that the back EMF voltage generated in the off winding is phase-shifted relative to the torque curve of the energized windings. When back EMF voltage of the off-winding reaches its peak, the torque for the energized pair is at a stable zero point. FIG. 9 shows the relationship between back EMF voltage which is examined for information and motor torque as a function of rotor position.

Upon motor start-up, the rotor is at an arbitrary position relative to the torque angle curve of the two energized phases. This start-up can result in rotor position being along the curve of FIG. 9 in either the positive portion, the negative portion or at an equilibrium point. Upon energizing a phase pair in the motor, the rotor will oscillate along the torque angle curve until the rotor eventually damps out at the stable equilibrium position. The stable equilibrium point is a known position relative to the energized motor windings. With the rotor at this known position, the correct winding pair for rotation in a positive direction with maximum torque can be energized. FIG. 9 shows that the peaks of the back EMF voltage occur at the equilibrium position of the rotor on the torque angle curve. Employing the window comparator circuit and the slope detection circuit, the back EMF voltage through the stable equilibrium position can be determined within one or two oscillations of the motor. Since this stable equilibrium position is known, it is not necessary to wait for the rotor to damp out before accelerating the motor.

Figure 10:
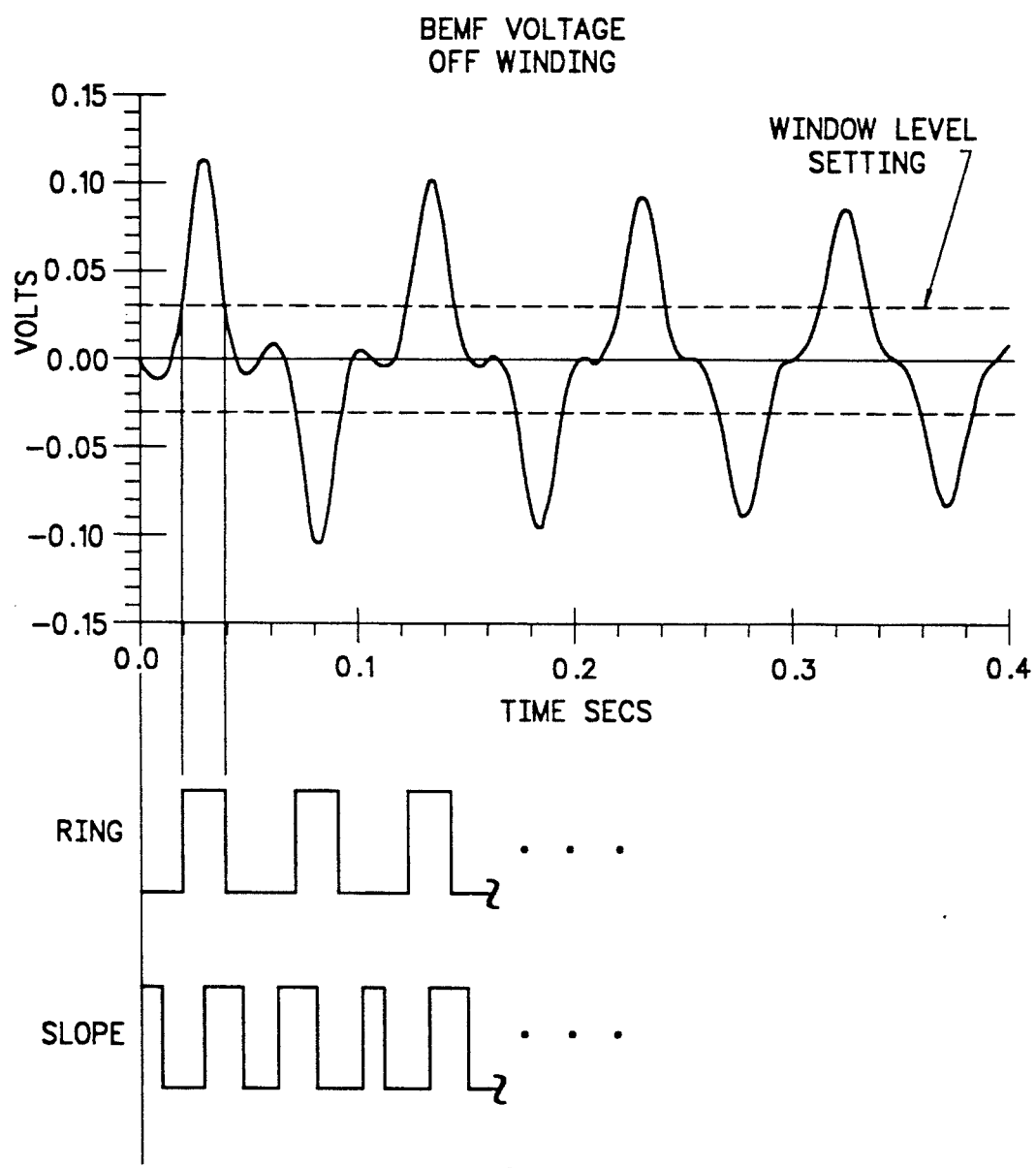
FIG. 10 depicts an exemplary back EMF wave form as a function of time which is generated in the off phase as the rotor oscillates into its stable point and the RING and SLOPE signals generated by the position detection circuitry.

FIG. 10 shows the back EMF wave form plotted as a function of tinge as it is generated in the off-winding during a period in which the rotor is oscillating to a stable equilibrium point. The window comparator circuitry qualifies the peaks of the back EMF so that only peaks which occur at the stable torque point are considered as position information. The slope detector circuitry pinpoints the peak of the back EMF by detecting the change in slope at that point. By detecting the peak of back EMF the position of the rotor relative to the energized windings is obtained. Current may then be switched into the proper windings for producing maximum torque in the desired direction. Back EMF peaks of negative polarity indicate that the rotor is moving through the stable equilibrium position reverse to the desired direction. These peaks are ignored and commutation is delayed until the next positive back EMF peak.

Using the aforementioned means, examination of back EMF after only a few cycles provides a known rotor position thereby completing initial motor start-up. With rotor location identified, the winding sequencer has its starting position and from there a back EMF zero-crossing commutation scheme is employed to accelerate the motor.

What is claimed is:

1. Apparatus for starting a three-phase brushless DC motor comprising:
   means for electrically energizing phase windings of a motor thereby inducing movement of a rotor; and
   means for detecting during said start-up of the motor a qualified range of the back EMF signal in an off-winding of the motor so as to determine a suitable rotor position for start-up while said energized phase windings remain energized, said suitable position determinable from slope and polarity data derived over said qualified range of said back EMF signal.

2. The apparatus of claim 1 wherein said detecting means further comprises means for measuring back EMF voltage in unenergized phases of said motor comprising:
   first circuit means for qualifying peaks in said back EMF voltage, said qualifying means for establishing a qualified range of data to be processed by eliminating measured peaks in the back EMF voltage that occur below an absolute value threshold voltage; and
   second circuit means for determining a peak and polarity in the back EMF voltage in an unenergized phase of said motor, said second circuit means comprising means for determining slope and polarity data of said back EMF voltage over said qualified range.

3. Apparatus of claim 2 wherein said means for measuring back EMF voltage further comprise a selectable fixed gain amplifier means for examining the differential signal across the unenergized motor winding.

4. A method for the start-up of a brushless DC three-phase motor having a rotor comprising:
   resetting logic and sequence circuitry;
   energizing a pair of phase windings of the motor;
   qualifying a range of the back EMF voltage in the unenergized phase of the motor for processing;
   determining slope and polarity data of said back EMF signal over said qualifying range;

detecting a known position of the rotor while said pair of energized phase windings remain energized from said slope and polarity data; and accelerating the motor.

5. Method of claim 4 wherein qualifying a range in the back EMF voltage in the unenergized phase of the motor comprises:

eliminating measured peaks in back EMF voltage that do not occur approximately when zero torque is generated by the energized phases of the motor; and determining slope and polarity data over the qualifying range of the back EMF voltage in an unenergized phase of the motor.

6. A method for the start-up of a brushless DC three-phase motor comprising:
   a. resetting a sequencer and start-up logic so as to select a first pair of motor windings for energization;
   b. analyzing a rotor for movement;
   c. energizing said selected pair of motor windings;
   d. examining the back EMF signal in a first unenergized motor winding;
   e. selecting a second pair of motor windings for energization if the EMF signal in step d is below a predetermined threshold.
   f. energizing said second pair of motor windings if the selection of step e is made;
   g. obtaining a non-zero examined back EMF signal, thereby indicating rotor movement in response to winding pair energization;
   h. qualifying a range of said non-zero back EMF signal eliminating all portions of said non-zero back EMF signal except predetermined peaks for processing;
   i. processing said non-zero back EMF signal, determining slope and polarity data of said back EMF signal over said qualifying range;
   j. detecting while said energized pair remains energized a slope transition from negative to positive polarity from said slope and polarity data corresponding to said non-zero back EMF signal qualified peaks, thereby resolving rotor location with respect to the motor stator;
   k. setting the phase sequencer to a starting position based on said rotor location with respect to the motor stator; and
   l. commutating the motor to operating speed.

7. Method of claim 5, wherein said step of eliminating measured peaks in back EMF voltage that do not occur approximately when zero torque is generated by the energized phases of the motor comprises:

qualifying peaks in said back EMF voltage thereby establishing a range of data to be processed by eliminating measured peaks in the back EMF voltage that fall below a positive threshold and above a negative threshold.

8. Method of claim 6, wherein said step of resolving rotor location with respect to the motor stator comprises:

examining back EMF for a few oscillations of the rotor, said oscillation being due to the maintenance of the energized phase pair in said energized state.

9. In combination with a sensorless brushless direct current motor, said motor including a permanent magnet rotor, a stator having three phases, and an energization means for sequentially in a plurality of predetermined commutations energizing simultaneously a pair of three phases while maintaining the remaining phase in an unenergized state, the improvement which comprises:
   a. means for electrically energizing said pair of phases during start-up of said motor, thereby inducing movement of said rotor, said energized pair of phases being maintained in said energized state following said movement.
   b. means for detecting the back EMF developed in said unenergized phase while said energized phase pair is maintained in said energized state.
   c. means for qualifying peaks in said back EMF voltage, thereby establishing a qualified range of data to be processed.
   d. means for detecting a qualified peak of the back EMF signal in said unenergized phase of said motor while said energized phase pair is maintained in said energized state, whereby the direction of rotation and position of said rotor may be determined during start-up by processing slope and polarity data of said back EMF voltage over said qualified range.

10. The method of detecting the direction of rotation and position of a rotor of a sensorless brushless direct current motor during start-up, said motor including a permanent magnet rotor, a stator having three phases, and an energization means for sequentially in a plurality of predetermined commutations energizing simultaneously a pair of said three phases while maintaining the remaining phase of said three phases in an unenergized state, said method comprising:
   a. electrically energizing said pair of phase during start-up of said motor, thereby inducing movement of said rotor, said energized pair of phases being maintained in said energized state following said movement.
   b. detecting the back EMF developed in said unenergized phase while said energized phase pair is maintained in said energized state.
   c. detecting a qualified peak of the back EMF signal in said unenergized phase of said motor while said energized phase pair is maintained in said energized state.
   d. processing slope and polarity data of said qualified peak, whereby the direction of rotation and position of said rotor is determined during start-up.

* * * * *